US011877170B2

(12) United States Patent
Holmbacka et al.

(10) Patent No.: US 11,877,170 B2
(45) Date of Patent: Jan. 16, 2024

(54) AUTOMATED EVALUATION OF EFFECTS OF CHANGES IN COMMUNICATIONS NETWORKS

(71) Applicant: Elisa Oyj, Helsinki (FI)

(72) Inventors: Simon Holmbacka, Helsinki (FI); Jukka-Pekka Salmenkaita, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/000,630

(22) PCT Filed: Jun. 2, 2021

(86) PCT No.: PCT/FI2021/050403
§ 371 (c)(1),
(2) Date: Dec. 2, 2022

(87) PCT Pub. No.: WO2021/250314
PCT Pub. Date: Dec. 16, 2021

(65) Prior Publication Data
US 2023/0199536 A1 Jun. 22, 2023

(30) Foreign Application Priority Data
Jun. 10, 2020 (FI) .................................... 20205600

(51) Int. Cl.
*H04W 24/08* (2009.01)
(52) U.S. Cl.
CPC .................. *H04W 24/08* (2013.01)
(58) Field of Classification Search
CPC .................................................. H04W 24/08
See application file for complete search history.

(56) References Cited

U.S. PATENT DOCUMENTS

2003/0014128 A1* 1/2003 Pathak ............... H04L 43/0888
700/14
2005/0256677 A1* 11/2005 Hayes ................ G06F 11/3452
702/179

(Continued)

FOREIGN PATENT DOCUMENTS

WO 2005089385 A3 1/2007

OTHER PUBLICATIONS

Finnish Patent and Registration Office, Search Report, Application No. 20205600, dated Apr. 27, 2021, 1 page.

(Continued)

*Primary Examiner* — Walli Z Butt
*Assistant Examiner* — Thad N Defauw
(74) *Attorney, Agent, or Firm* — Ziegler IP Law Group

(57) ABSTRACT

A method for evaluating effect of a change in a communications network includes receiving a first set of performance indicator values. measured over a first period of time before the change in the communications network; receiving a second set of performance indicator values with performance indicator values measured over a second period of time after the change in the communications network; comparing the first set and the second set to evaluate the effect of the change; determining a performance threshold based on the performance indicator values of the first set; determining a first performance ratio value based on the performance indicator values of the first set and the performance threshold; determining a second performance ratio value based on the performance indicator values of the second set and the performance threshold and providing output based on the first performance ratio value and the second performance ratio value.

15 Claims, 5 Drawing Sheets

(56) References Cited

U.S. PATENT DOCUMENTS

| | | |
|---|---|---|
| 2013/0288686 A1 | 10/2013 | Chou |
| 2015/0092641 A1* | 4/2015 | Koc .................. H04W 28/16 |
| | | 370/311 |
| 2016/0286411 A1* | 9/2016 | Tarraf ................ H04W 24/02 |
| 2019/0342187 A1 | 11/2019 | Zavesky et al. |
| 2019/0384263 A1 | 12/2019 | Kono et al. |
| 2021/0400506 A1* | 12/2021 | Nabeshima .......... H04W 24/08 |

OTHER PUBLICATIONS

The International Search Report and Written Opinion of the International Searching Authority, European Patent Office, Application No. PCT/FI2021/050403, dated Jul. 6, 2021, 14 pages.

* cited by examiner

301. Receiving a first set of performance indicator values measured before a change 302. Receiving a second set of performance indicator values measured after the change 303. Choosing comparison period from the first set 304. Determining performance threshold based on the comparison period 305. Determining first performance ratio based on the performance threshold and the first set 306. Determining second performance ratio based on the performance threshold and the second set 307. Outputting result of the evaluation based on the first performance ratio and the second performance ratio

Fig. 3

AUTOMATED EVALUATION OF EFFECTS OF CHANGES IN COMMUNICATIONS NETWORKS

TECHNICAL FIELD

The present disclosure generally relates to automated monitoring and control of communications networks. The disclosure relates particularly, though not exclusively, to automated evaluation of effects of changes in communications networks.

BACKGROUND

This section illustrates useful background information without admission of any technique described herein representative of the state of the art.

Cellular communications networks are complex systems comprising a plurality of cells serving users of the network. When users of the communications network move in the area of the network, connections of the users are seamlessly handed over between cells of the network. There are various factors that affect operation of individual cells and co-operation between the cells. In order for the communications network to operate as intended and to provide planned quality of service, cells of the communications network need to operate as planned. For example, the cells need to provide sufficient coverage without too much interfering with operation of neighboring cells.

In general, operation of the communications networks is continuously monitored and controlled in order to optimize operation of the communications network and to detect any problems in operation of the communications network so that appropriate changes can be made when needed. The change may be for example a change in the power saving schedule, tilt angle, load balancer or some other configuration parameter of the communications network. After the change has been performed it is usually evaluated, whether the change provided the desired effect and/or solved the detected problem. This can be done by comparing performance before and after the change, but the comparison is not straightforward to implement as the change may affect multiple factors in the communications network.

Now there is provided a new method for comparing the performance.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the present disclosure.

According to a first example aspect there is provided a computer implemented method for evaluating effect of a change in a communications network. The method comprises receiving a first set of performance indicator values comprising performance indicator values measured over a first period of time before the change in the communications network;

receiving a second set of performance indicator values comprising performance indicator values measured over a second period of time after the change in the communications network;

comparing the first set and the second set to evaluate the effect of the change;

determining a performance threshold based on the performance indicator values of the first set;

determining a first performance ratio value based on the performance indicator values of the first set and the performance threshold;

determining a second performance ratio value based on the performance indicator values of the second set and the performance threshold; and providing output based on the first performance ratio value and the second performance ratio value.

In some example embodiments, the method further comprises calculating and outputting difference between the first performance ratio value and the second performance ratio value; or outputting the first performance ratio value and the second performance ratio value.

In some example embodiments, the method further comprises receiving raw performance indicator values and pre-processing the raw performance indicator values to provide the first set of performance indicator values and the second set of performance indicator values.

In some example embodiments, the method further comprises determining the first performance ratio by comparing performance indicator values of the first set to the performance threshold; and determining the second performance ratio by comparing performance indicator values of the second set to the performance threshold.

In some example embodiments, the performance threshold is determined based on performance indicator values of the first set within a chosen comparison period within the first time period.

In some example embodiments, the method further comprises determining the first performance ratio by comparing performance indicator values of the first set outside the comparison period to the performance threshold; and determining the second performance ratio by comparing performance indicator values of the second set to the performance threshold.

In some example embodiments, the comparison period is chosen based on a performance indicator value representing the worst performance within the first time period or based on busiest moment of time within the first time period.

In some example embodiments, the comparison period is chosen to include a point of time having the lowest throughput within the first time period or a point of time having the largest amount of simultaneous users or a point of time having the largest traffic load within the first time period.

In some example embodiments, the comparison period is chosen based on aggregated performance indicator values over multiple subperiods within the first time period.

In some example embodiments, the comparison period is a time period comprising multiple performance indicator values.

In some example embodiments, the performance threshold is determined based on the best performance indicator value within the comparison period, based on average of the performance indicator values within the comparison period, or based on chosen percentile of the performance indicator values within the comparison period.

In some example embodiments, the first and second time periods are 24 hour time periods or multiples of 24 hour time periods. In some example embodiments, the first and second time periods are 1-4 weeks.

In some example embodiments, the change in the communications network is related to power saving actions. Additionally or alternatively, the change may be related to one or more of: performance optimization, increasing capacity, load balancing, adjusting antenna tilt, changing antenna beamforming configuration, and solving a performance problem.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect of the present disclosure, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 3 shows a flow diagram illustrating example methods according to certain embodiments.

DETAILED DESCRIPTION

In the following description, like reference signs denote like elements or steps.

A challenge in evaluating effects of a change implemented in a communications network is that a change may degrade some aspects of the performance and improve some other aspects. Embodiments of the present disclosure provide a method that allows evaluating if the overall performance is sufficient after the change.

Figure 1:
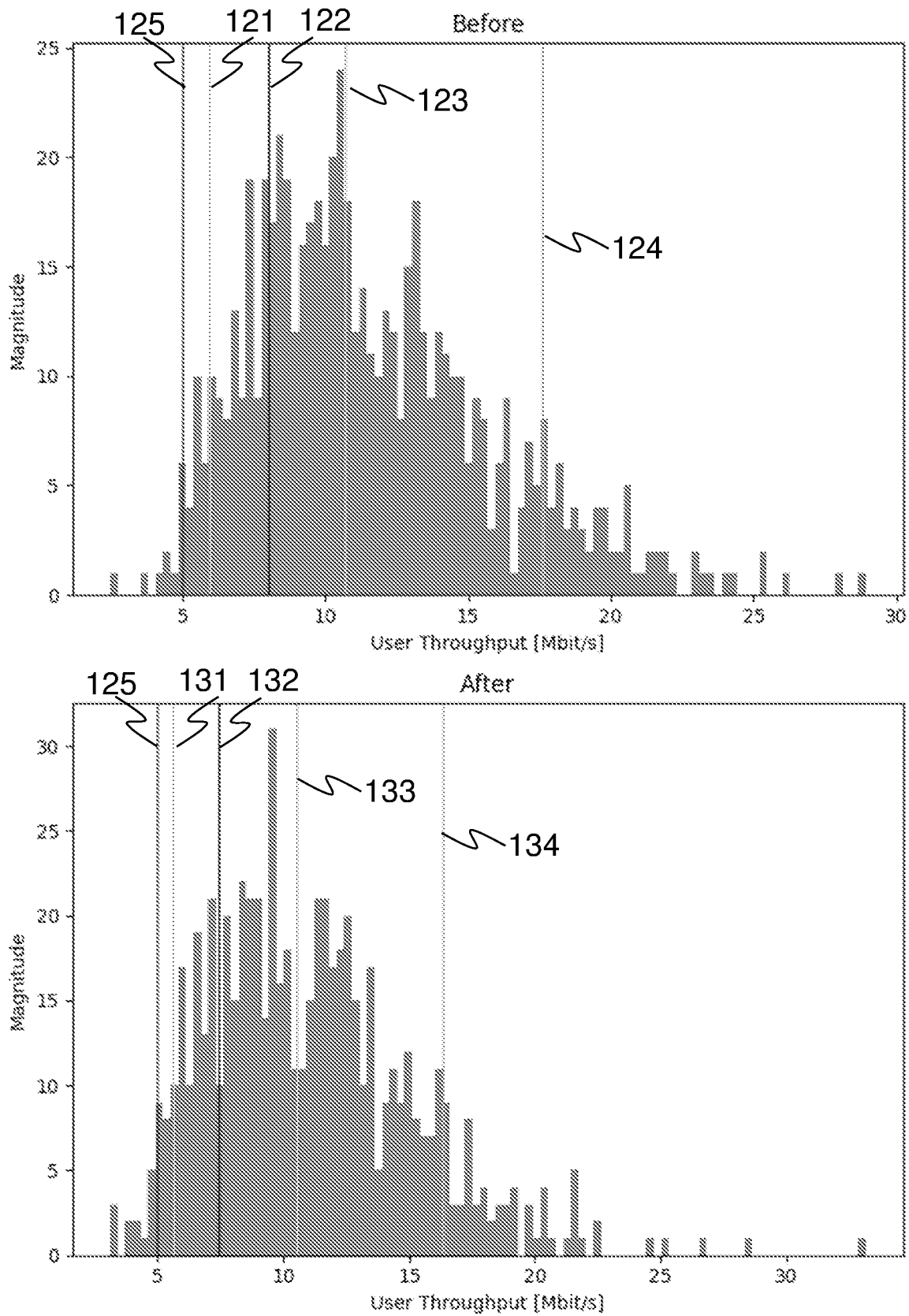
FIG. 1 shows a graph illustrating user throughput before and after a change in an example case.

FIG. 1 shows a graph illustrating user throughput before and after a change in an example case. The before graph shows that $5^{th}$ percentile 121 throughput is 5.926 Mbit/s, $20^{th}$ percentile 122 throughput is 7.992 Mbit/s, median (or $50^{th}$ percentile) 123 throughput is 10.71 Mbit/s, and $90^{th}$ percentile 124 throughput is 17.615 Mbit/s. 98.25% of users have throughput above 5.0 Mbit/s threshold 125. The after graph shows that $5^{th}$ percentile 131 throughput is 5.618 Mbit/s, $20^{th}$ percentile 132 throughput is 7.438 Mbit/s, median 133 throughput is 10,501 Mbit/s, and $90^{th}$ percentile 134 throughput is 16.345 Mbit/s. 97.45% of users have throughput above 5.0 Mbit/s threshold 125. From the graphs it can be seen that it is not directly clear what was the effect of the change and whether desired user satisfaction level is likely reached or not in the after graph. Consequently it is difficult to set absolute thresholds that need to be reached after the change.

It is to be noted that in the following, effects of a single change are mainly discussed, but clearly plurality of changes can be evaluated correspondingly in parallel or sequentially one after another.

Figure 2A:
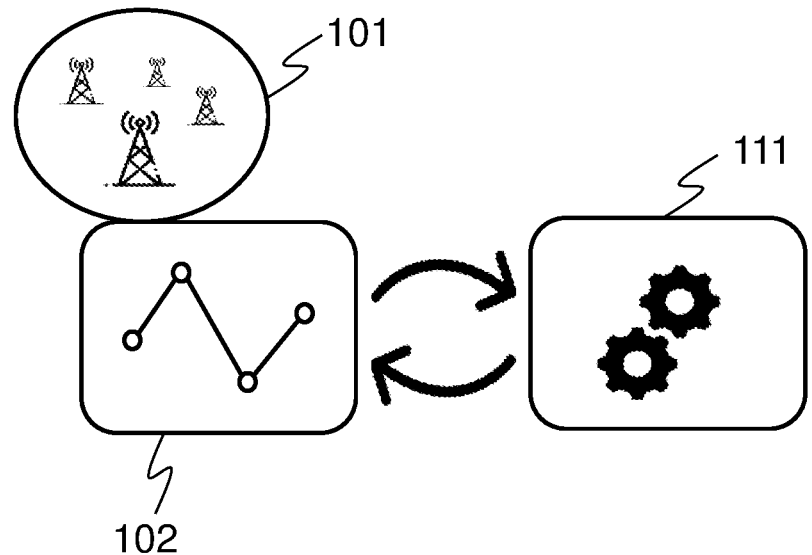
FIG. 2A schematically shows an example scenario according to an example embodiment.

FIG. 2A schematically shows an example scenario according to an embodiment. The scenario shows a communications network 101 comprising a plurality of cells and base stations and other network devices, and an operations support system, OSS, 102 configured to manage operations of the communications network 101. Further, the scenario shows an automation system 111. The automation system 111 is configured to implement automated monitoring of operation of the communications network 101. The automation system 111 is operable to interact with the OSS 102 for example to receive performance data from the OSS 102 and to provide modified or new parameter values and configurations to the OSS 102 for use in the communications network 101.

The automation system 111 is configured to implement at least some example embodiments of present disclosure.

In an embodiment of the present disclosure the scenario of FIG. 2A operates as follows: The automation system 111 receives performance data from the OSS 102. The automation system gathers performance data from a first time period before a change is implemented in the communications network and from a second time period after the change. The change may comprise changing one or more parameter values, modifying configuration and/or making changes in network equipment.

The performance data is automatically analysed in the automation system 111 to evaluate effects of the change. The results of the analysis may be provided for further automated processes running in the automation system 111 or shown on a display or otherwise output to a user.

The analysis may be automatically or manually triggered. The analysis may be performed in association with all changes implemented in the communications network or in association with some selected changes. Further, it is to be noted that the analysis may be performed substantially at the same time as the change or the analysis may be performed even later as long as the necessary information is available for the analysis.

Figure 2B:
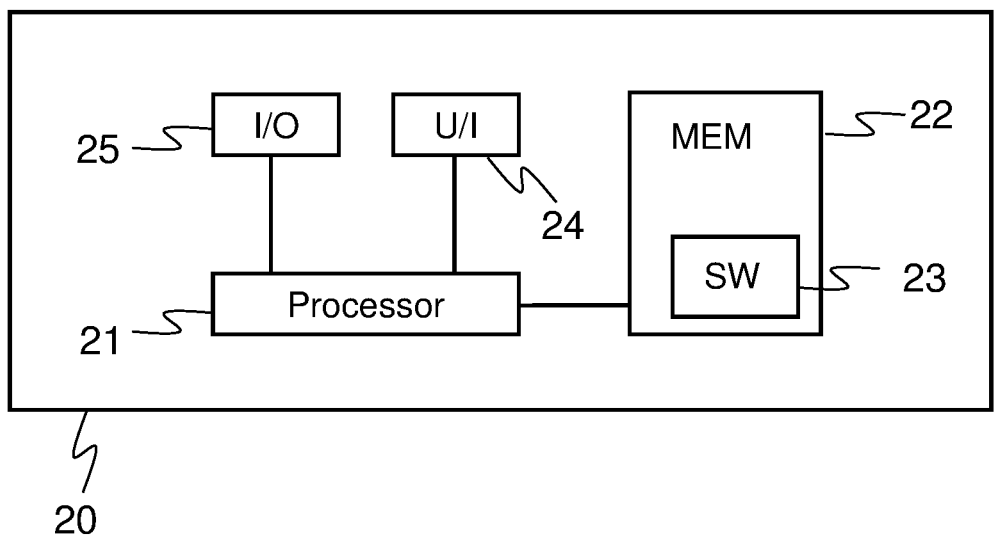
FIG. 2B shows a block diagram of an apparatus according to an example embodiment.

FIG. 2B shows a block diagram of an apparatus 20 according to an embodiment. The apparatus 20 is for example a general-purpose computer or server or some other electronic data processing apparatus. The apparatus 20 can be used for implementing at least some embodiments of the present disclosure. That is, with suitable configuration the apparatus 20 is suited for operating for example as the automation system 111 of foregoing disclosure.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2B, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2B, but the embodiments of the present disclosure may equally be implemented in a cluster of shown apparatuses.

FIG. 3 shows a flow diagram illustrating example methods according to certain embodiments. The methods may be implemented in the automation system 111 of FIG. 2A and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different phases shown in the flow diagrams may be combined with each other and the order of phases may be changed except where otherwise explicitly defined. Furthermore, it is to be noted that performing all phases of the flow diagrams is not mandatory.

The method of FIG. 3 provides evaluating effects of a change in a communications network. In an embodiment the change in the communications network is related to power save actions. Additionally or alternatively, the change may be related to one or more of performance optimization, increasing capacity, load balancing and solving a performance problem. The change may be for example a change in power saving schedule, tilt angle, antenna beamforming configuration, load balancer or some other configuration parameter of the communications network. The method of FIG. 3 comprises the following phases:

301: A first set of performance indicator values is received. The performance indicator values of the first set are measured over a first period of time before the change taking place in the communications network.

302: A second set of performance indicator values is received. The performance indicator values of the second set are measured over a second period of time after the change has been effected in the communications network.

It is to be noted that the first and second set of performance indicator values may be received separately or concurrently. Additionally or alternatively, the first and second set of performance indicator values may be received in pieces.

The performance indicator values may relate to throughput; signal-to-interference-plus-noise ratio, SINR, values; Reference Signals Received Power, RSRP, values; signal strengths; and other performance indicators available in communications networks. The performance indicator values may be referred to a Key Performance Indicators, KPI. More than one performance indicator type may be taken into account.

The performance indicator values may provide absolute values or they may be bin structured. Bin structured performance indicator values are discussed in more detail later in this disclosure. It is possible that only part of the received performance indicator values are analysed, or that the received values are analysed in parts for evaluating different effects. The analysis may be directed to certain percentile, such as for example $10^{th}$, $50^{th}$ or $90^{th}$ percentile.

The first and second time periods may be equally long or their lengths may differ from each other. In an embodiment, first and second time periods are 24 hour time periods. Alternatively, the first and second time periods may be multiples of 24 hour time periods. By using a 24 hour time period or multiples thereof, one achieves that hourly variation in network usage is covered. In an embodiment, the first and second time periods are 1-4 weeks. By using a longer time period daily or even weekly variation of network usage is covered. It is to be noted that even longer time periods may be used.

The first set and the second set are then compared to evaluate the effect of the change. When bin structured performance indicator values are compared, the comparison may concern comparison of distribution of values in the bins.

A performance threshold is determined based on the performance indicator values of the first set and the performance threshold is used for determining a performance ratios before and after the change. The performance ratios are them compared to evaluate the effect of the change. Phases 303-306 provide one example implementation.

Conceptually, data points above the performance threshold are considered acceptable and providing desired or sufficiently good user experience, whereas data points below the performance threshold are considered unacceptable. It is to be noted that in some cases this may be the other way around. That is, data points below the performance threshold may be considered acceptable and providing desired or sufficiently good user experience, whereas data points above the performance threshold are considered unacceptable.

The performance ratios may be referred to as sub performance ratios as, at least in some embodiments, the performance ratio indicates how large portion of the performance is below the determined performance threshold.

303: A comparison period is chosen from the first set. In an embodiment, the comparison period is chosen based on a performance indicator value representing the worst performance, such as lowest throughput, within the first time period. In another alternative, the comparison period is chosen based on busiest moment of time within the first time period. For example busiest hour within the first time period may be chosen as the busiest moment. The comparison period may be chosen to include a point of time having the highest amount of simultaneous users or the largest traffic load within the first time period. The comparison period is determined to be a certain time period before and after the point of time representing the worst performance or busiest moment. The time period may be for example one hour in each direction, although this only one example.

In an example, the comparison period can be chosen based on aggregated performance indicator values over multiple subperiods within the first time period. For example, in a case where the first set comprises hourly performance indicator values for one week (i.e. seven days), an average can be determined for performance of an hour of day on different days of week to evaluate average performance during that hour. The comparison period may then be chosen to be the hour that, on average, has the worst performance. It is to be noted that this is only one specific example and others are possible, too. For example, instead of taking average, the performance indicator values may be differently aggregated. For example, sum, median or desired percentile could be used.

In general, it may be defined that the comparison period is a time period comprising multiple performance indicator values. Length of the comparison period may be for example 2-4 hours, but equally some other length may be used.

If multiple points of time with equally bad performance or multiple equally busy moments of time should exist, the method may pick the first one or randomly any one of such points or based on the values from a sliding window over the points.

304: A performance threshold is determined based on the comparison period. In an embodiment, the performance threshold is determined based on the best performance indicator value within the comparison period. The best performance indicator value may be as such chosen to be the performance threshold or there may be some error marginal that is taken into account. In another embodiment, the performance threshold is determined based on average or chosen percentile of the performance indicator values within the comparison period.

305: A first performance ratio value is determined based on the performance threshold and the performance indicator values of the first set. In an embodiment, the first performance ratio value is determined by comparing performance indicator values of the first set to the performance threshold. In another embodiment, the first performance ratio value is determined by comparing performance indicator values of the first set outside the comparison period to the performance threshold. That is, the values of the comparison period are not taken into account. In an embodiment, the first performance ratio value is ratio of number of the performance indicator values of the first set above the performance threshold to the number of the performance indicator values of the first set below the performance threshold. In another embodiment, the first performance ratio is ratio of integral of the area defined by the performance indicator values of the first set above the performance threshold to the integral of the area defined by the performance indicator values of the first set below the performance threshold. In this way, magnitude of the performance indicator values is better taken into account. In yet another embodiment, the first performance ratio is ratio of sum of performance indicator values above the threshold to sum of performance indicator values below the threshold. Also this option takes into account the magnitude of the performance indicator values.

306: A second performance ratio value is determined based on the performance threshold and the performance indicator values of the second set. In an embodiment, the second performance ratio value is determined by comparing performance indicator values of the second set to the performance threshold. In general, the comparison of the performance indicator values of the second set to the performance threshold employs the same principles as the comparison of the performance indicator values of the first set to the performance threshold in order to produce comparable results.

In an embodiment, the second performance ratio value is ratio of number of the performance indicator values of the second set above the performance threshold to the number of the performance indicator values of the second set below the performance threshold. In another embodiment, the comparison is based on comparing integral of the areas above and below the threshold. In yet another embodiment, the comparison is based on comparing the sums of the performance indicator values above and below the threshold.

307: Result of the evaluation is output based on the first performance ratio value and the second performance ratio value. In an embodiment, difference between the first performance ratio value and the second performance ratio value is calculated and the difference is output as the result of the evaluation. In another alternative, the first performance ratio value and the second performance ratio value are output as the result of the evaluation without further processing by the automated evaluation method.

By using a comparison period related to the worst performance within the first time period as a basis for the comparison of the performance before and after the change, one achieves that focus is on evaluating the effects on the worst performance. This results in comparison that provides relevant results as it is usually not necessary to boost good performance to even better. Instead, it is often important to improve the worst performing part. Still further, sometimes it may be ok to sacrifice some of the over performance, i.e. to degrade the best performing part.

In telecommunication systems many performance indicators are expressed in bins instead of absolute values of single variable. RSRP; MCS, Modulation and Coding Scheme; and QCI, QoS Class Identifier, are some examples of such performance indicators. The number of bins can vary. For example, RSRP in LTE, Long Term Evolution, network has 18 bins and MCS has 28 bins.

Data samples are placed in a certain bin depending on the value of the data sample. For example RSRP values between −96 and −98 dB are placed in Bin 1 and values between −98 and −100 dB are placed in Bin 2. Data is thus discretized to closest bin. Statistics can be produced based on arithmetic calculations on the amount of samples in each bin. Common calculations on bin structures provide percentile values. A percentile is a measure used in statistics indicating the value below which a given percentage of observations in a group of observations falls. For example, the $20^{th}$ percentile is the value (or score) below which 20% of the observations may be found. Equivalently, 80% of the observations are found above the $20^{th}$ percentile. $50^{th}$ percentile or median is the value (or score) below which 50% of the observations may be found.

In the case of the bin structure, the percentiles may be rounded to the closest bin. For example, if the $50^{th}$ percentile includes some part of a bin 3, the $50^{th}$ percentile value would be given as bin 3. Alternatively, a more precise value can be used if distribution of values within bins is known or can be considered to be at least roughly continuous.

Other arithmetic calculations can be used to analyze the data distribution in the bins e.g. variance, standard deviation, skewness, cumulative distribution or other calculations from the domain of computational geometry.

In some embodiments of present disclosure, bin structured raw performance indicator values may be preprocessed and the comparison of the performance indicator values for example according to the method of FIG. 3 may be performed on the preprocessed indicator values. The preprocessed indicator values may be for example performance indicator values representing certain percentile extracted from the raw performance indicator values. In another example, the preprocessed indicator values may represent data distribution in the bins. For example, if RSRP is concerned, it may be of interest to measure the median bin values or maybe the variance to determine what an average user is experiencing. Whereas, when measuring data volume in QCI bins, it may be of interest to look at the sum of all bins to determine the total data volume in a network cell. In this way, versatile analysis possibilities are provided, as the method of FIG. 3 provides generic analysis that is not dependent on the performance indicator values that are analysed. The only requirement is that substantially similar performance indicator values need to be available from a time period before a change and from a time period after a change.

FIGS. 4-7 show graphs illustrating some example cases.

Figure 4:
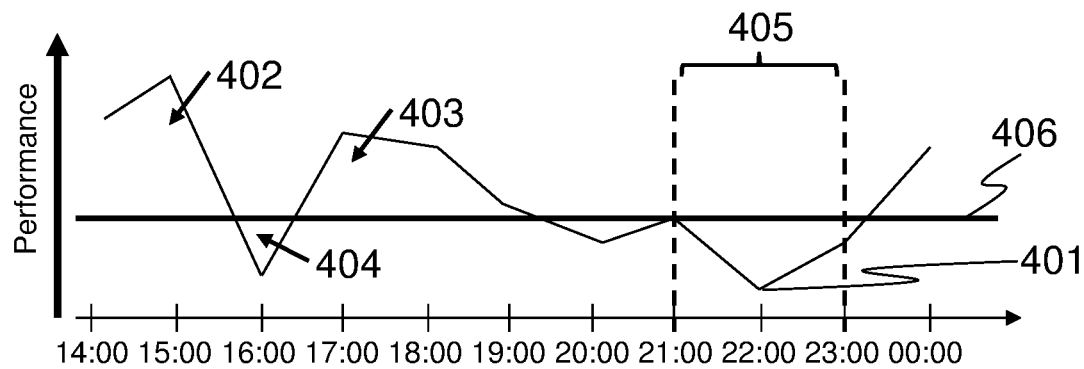
FIGS. 4-7 show graphs illustrating some example cases.

FIG. 4 shows a graph of a set of values of a generic performance indicator over a time period from 14:00 to 00:00. The higher the value, the better the performance is in this example. It is to be noted that in some cases this may the other way around. Point 401 at 22:00 represents the worst performance in this set. A comparison period 405 is defined by extending one hour to each direction from the point 401 resulting in comparison period from 21:00 to 23:00. The best performance indicator value within this period is used to determine a performance threshold illustrated by line 406. Areas 402 and 403 in the graph indicate good performance, whereas in area 404, the performance drops below the performance threshold 406 and is therefore considered insufficient performance. Performance ratio can be determined as ratio of data points above the line 406 to data points below the line 406.

Figure 5:
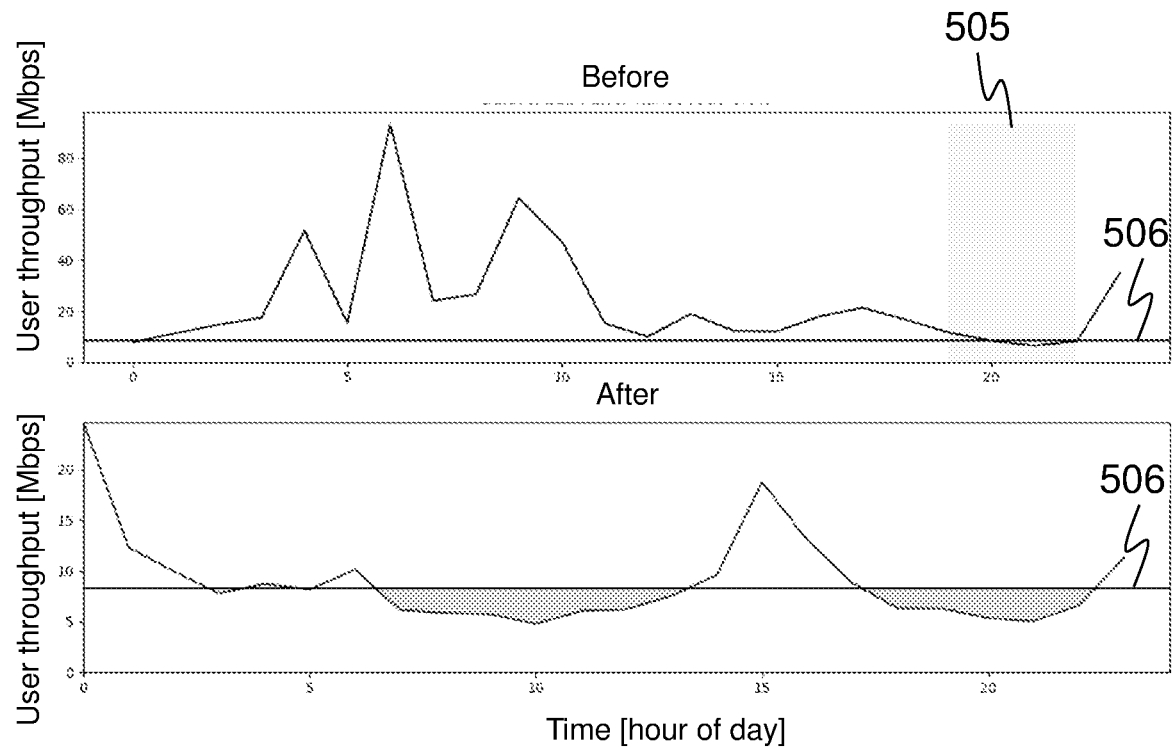

FIG. 5 shows an example of user throughput before and after a change. Area 505 from 19:00 to 22:00 indicates a comparison period determined from the before set and line 506 indicates performance threshold of 8.1 Mbps determined from the comparison period.

There is 0% user experience degradation in the before set as the throughput outside the comparison period is above the performance threshold 506.

There is 38% user experience degradation in the after set as the throughput dips below the performance threshold 506 for lengthy time periods.

The total user experience degradation difference is 38%.

Figure 6:
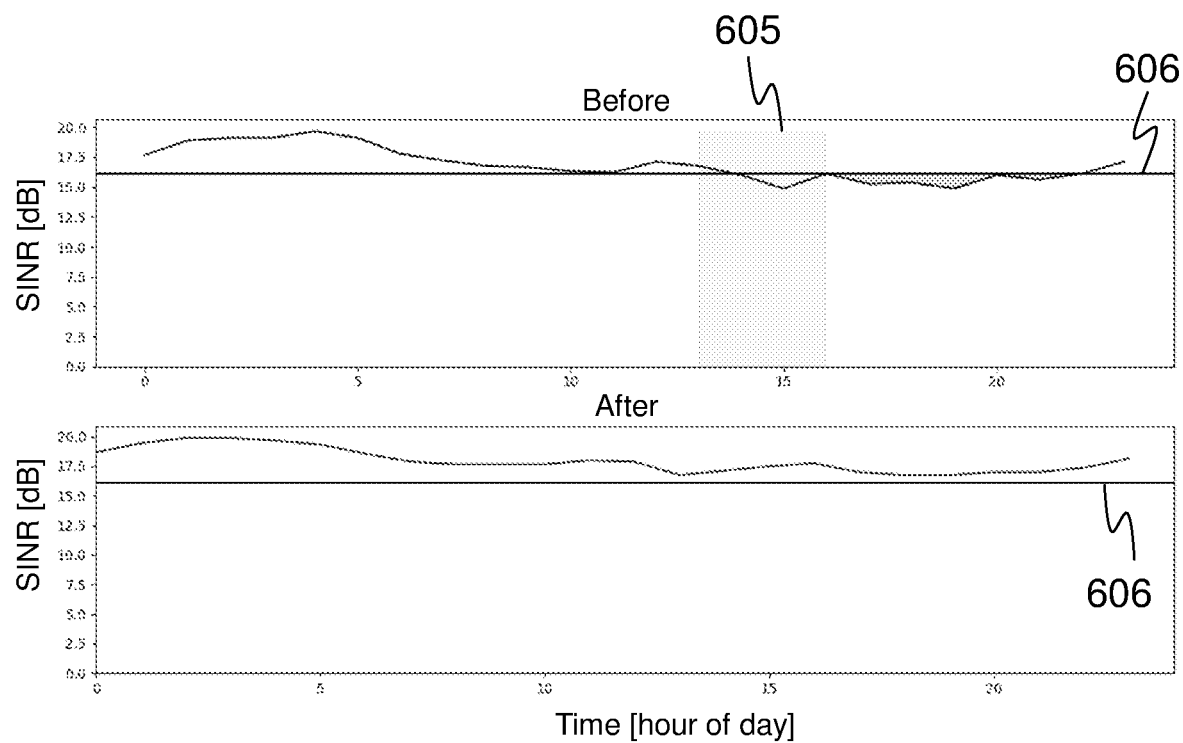

FIG. 6 shows an example of SINR before and after a change. Area 605 from 13:00 to 16:00 indicates a comparison period determined from the before set and line 606 indicates performance threshold of 16.8 dB determined from the comparison period.

There is 13% user experience degradation in the before set as the SINR dips below the performance threshold 606 after 16:00.

There is 0% user experience degradation in the after set as the SINR never dips below the performance threshold 606.

The total user experience degradation difference is −13% i.e. the situation has improved in the after set.

Figure 7:
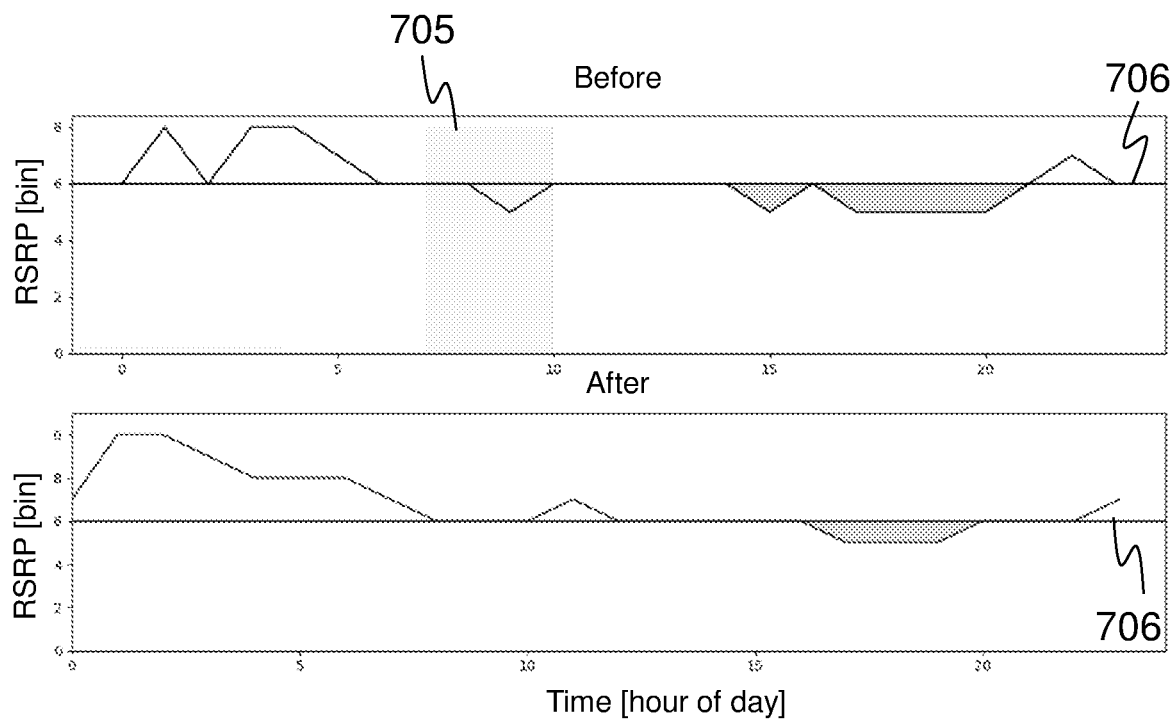

FIG. 7 shows an example of RSRP before and after a change. Area 705 from 07:00 to 10:00 indicates a comparison period determined from the before set and line 706 indicates performance threshold at $6^{th}$ bin determined from the comparison period.

There is 38% user experience degradation in the before set as the RSRP dips below the performance threshold 706 in the afternoon.

There is 5% user experience degradation in the after set as the RSRP continues to dip below the performance threshold 706 for a short time period in the afternoon.

The total user experience degradation difference is −33% i.e. the situation has improved in the after set.

In the examples of FIGS. 5-7, the values outside the comparison period are taken into account when determining the user experience degradation in the before set. Alternatively, also the values of the comparison period could be taken into account, whereby the resulting numbers would be slightly different.

Without in any way limiting the scope, interpretation, or application of the appended claims, a technical effect of one or more of the example embodiments disclosed herein is improved evaluation of effects of a change in a communications network. In particular, the example embodiments suit well for evaluating a change related to power saving action performed in a communications network. Power saving actions often involve temporarily limiting capacity when or where full capacity is not needed, but despite of this network performance needs to fulfil the desired user satisfaction requirements. Example embodiments help in ensuring this.

Some embodiments allow that some aspects of performance degrade as a consequence of the change, but nevertheless the result of the evaluation is that performance is considered sufficient, i.e. the performance fulfils the desired user satisfaction requirements, after the change.

Another technical effect of one or more of the example embodiments is that the evaluation method can be applied to various different KPIs. Different network experts often tend to look at different KPIs when evaluating effects. As the solutions of the various embodiments are equally applicable irrespective of the KPI that is looked at, different experts can easily use the same evaluation method.

If desired, the different functions discussed herein may be performed in a different order and/or concurrently with each other. Furthermore, if desired, one or more of the before-described functions may be optional or may be combined Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the present disclosure. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:

1. A computer implemented method for evaluating effect of a change in a communications network, the method comprising
receiving a first set of performance indicator values comprising performance indicator values measured over a first period of time before the change in the communications network;
receiving a second set of performance indicator values comprising performance indicator values measured over a second period of time after the change in the communications network;
comparing the first set and the second set to evaluate the effect of the change,
determining a performance threshold based on the performance indicator values of the first set, wherein the performance threshold is determined based on performance indicator values of the first set within a chosen comparison period of the first time period, wherein the first set comprises performance indicator values outside the comparison period;
determining a first performance ratio value based on the performance indicator values of the first set and the performance threshold by comparing performance indicator values of the first set outside the comparison period to the performance threshold;
determining a second performance ratio value based on the performance indicator values of the second set and the performance threshold by comparing the performance indicator values of the second set to the performance threshold; and
providing output based on the first performance ratio value and the second performance ratio value.

2. The method of claim 1, further comprising calculating and outputting difference between the first performance ratio value and the second performance ratio value; or outputting the first performance ratio value and the second performance ratio value.

3. The method of claim 1, further comprising receiving raw performance indicator values and preprocessing the raw performance indicator values to provide the first set of performance indicator values and the second set of performance indicator values.

4. The method of claim 1, further comprising
determining the first performance ratio by comparing performance indicator values of the first set to the performance threshold; and
determining the second performance ratio by comparing performance indicator values of the second set to the performance threshold.

5. The method of claim 1, wherein the comparison period is chosen based on a performance indicator value representing the worst performance within the first time period or based on busiest moment of time within the first time period.

6. The method of claim 1, wherein the comparison period is chosen to include a point of time having the lowest throughput within the first time period or a point of time having the largest amount of simultaneous users or a point of time having the largest traffic load within the first time period.

7. The method of claim 1, wherein the comparison period is chosen based on aggregated performance indicator values over multiple subperiods within the first time period.

8. The method of claim 1, wherein the comparison period is a time period comprising multiple performance indicator values.

9. The method of claim 1, wherein the performance threshold is determined based on the best performance indicator value within the comparison period, based on average of the performance indicator values within the comparison period, or based on chosen percentile of the performance indicator values within the comparison period.

10. The method of claim 1, wherein the first and second time periods are 24 hour time periods or multiples of 24 hour time periods.

11. The method of claim 1, wherein the first and second time periods are 1-4 weeks.

12. The method of claim 1, wherein the change in the communications network is related to power saving actions.

13. The method of claim 1, wherein the change in the communications network is related to one or more of: performance optimization, increasing capacity, load balancing, adjusting antenna tilt, changing antenna beamforming configuration, and solving a performance problem.

14. An apparatus comprising
a processor, and
a memory including computer program code; the memory and the computer program code configured to, with the processor, cause the apparatus to perform
receiving a first set of performance indicator values comprising performance indicator values measured over a first period of time before the change in the communications network;
receiving a second set of performance indicator values comprising performance indicator values measured over a second period of time after the change in the communications network;
comparing the first set and the second set to evaluate the effect of the change,
determining a performance threshold based on the performance indicator values of the first set, wherein the performance threshold is determined based on performance indicator values of the first set within a chosen comparison period of the first time period, wherein the first set comprises performance indicator values outside the comparison period;
determining a first performance ratio value based on the performance indicator values of the first set and the performance threshold by comparing performance indicator values of the first set outside the comparison period to the performance threshold;
determining a second performance ratio value based on the performance indicator values of the second set and the performance threshold by comparing the performance indicator values of the second set to the performance threshold; and providing output based on the first performance ratio value and the second performance ratio value.

15. A computer program comprising computer executable program code which when executed by a processor causes an apparatus to perform receiving a first set of performance indicator values comprising performance indicator values measured over a first period of time before the change in the communications network;

receiving a second set of performance indicator values comprising performance indicator values measured over a second period of time after the change in the communications network;

comparing the first set and the second set to evaluate the effect of the change, determining a performance threshold based on the performance indicator values of the first set, wherein the performance threshold is determined based on performance indicator values of the first set within a chosen comparison period of the first time period, wherein the first set comprises performance indicator values outside the comparison period;

determining a first performance ratio value based on the performance indicator values of the first set and the performance threshold by comparing performance indicator values of the first set outside the comparison period to the performance threshold;

determining a second performance ratio value based on the performance indicator values of the second set and the performance threshold by comparing the performance indicator values of the second set to the performance threshold; and providing output based on the first performance ratio value and the second performance ratio value.

* * * * *